March 5, 1957  H. J. RAU  2,783,573
FISH NET HAVING DETACHABLE RING
Filed June 1, 1955
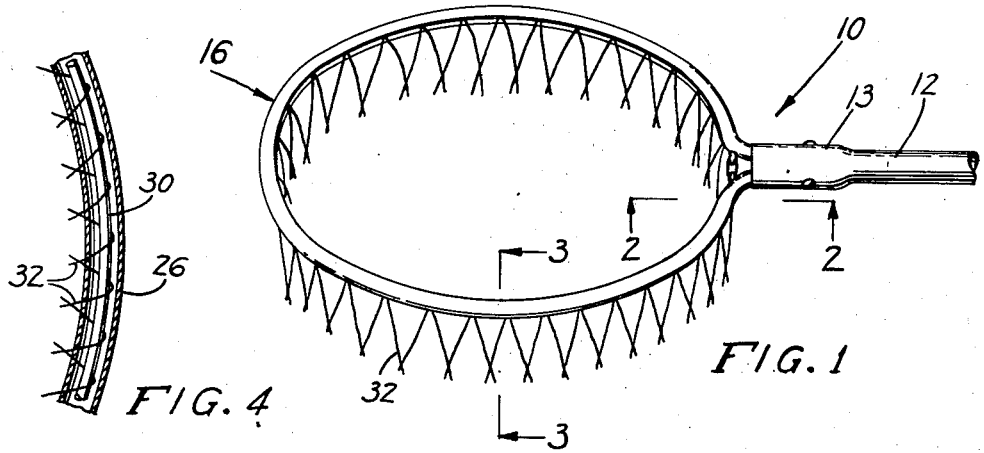
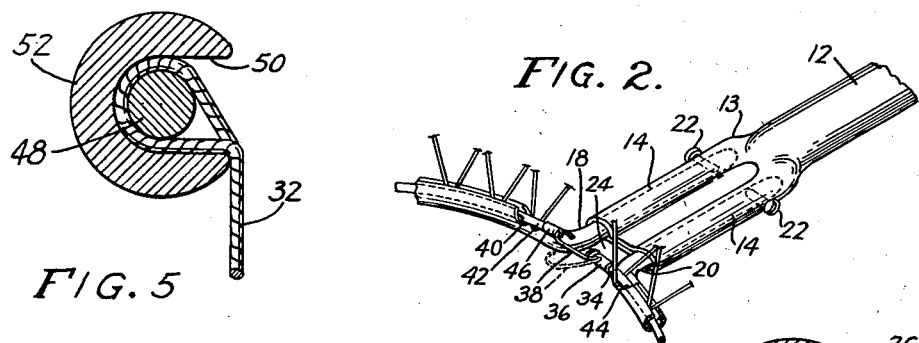
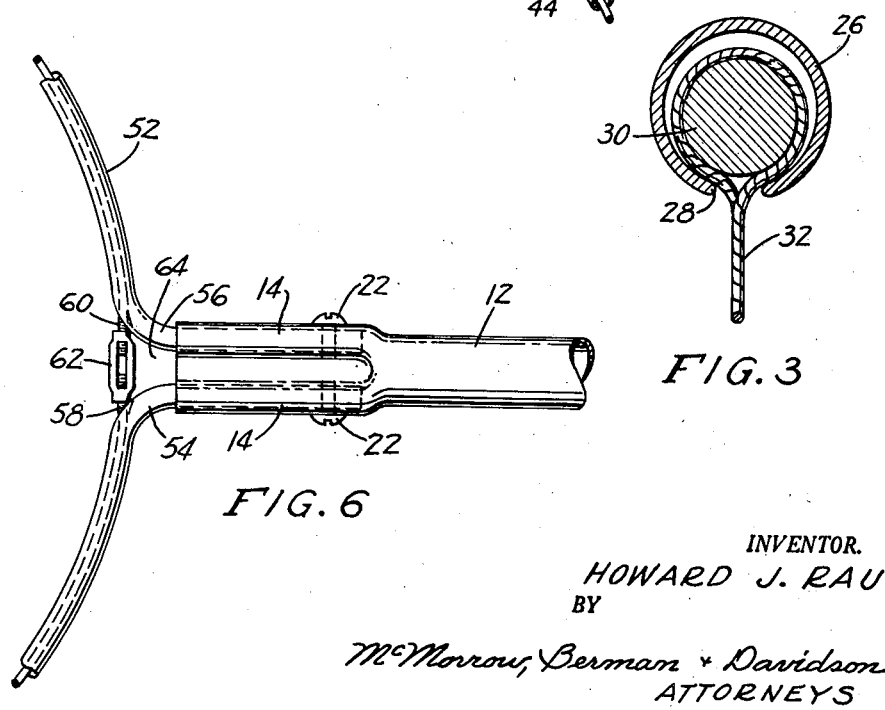
INVENTOR.
HOWARD J. RAU
BY
McMorrow, Berman & Davidson
ATTORNEYS

2,783,573
FISH NET HAVING DETACHABLE RING

Howard J. Rau, Covington, La., assignor of forty-nine percent to John F. Mitchell, Memphis, Tenn.

Application June 1, 1955, Serial No. 512,362

5 Claims. (Cl. 43—11)

This invention relates to a net for bait, game fish, and the like, and more particularly to a net having a detachable ring from which a mesh net body depends.

Normally, a fish net is a permanently assembled device throughout, including a handle, a ring rigid with and permanently secured to the handle, and a mesh net body carried by the handle.

Due to this fact, ordinarily a net cannot be used both for netting bait and also larger fish. For example, if the net body is of a very coarse or large mesh, it cannot be used for catching bait such as, for example grass shrimp or small minnows. Conversely, it is not desirable to use a small mesh net for boating large fish, since in many instances the net must be maneuvered with maximum speed through the water into position, and the small mesh may cause resistance to the desired rapid movement of the net body into a position under the fish.

Still further, the conventional net construction has other disadvantages. For example, when a net body becomes torn, or is otherwise in need of replacement, it is difficult to string a new body onto the ring of the device.

In view of the above, the main object of the present invention is to provide a generally improved net including a handle and a frame carried by the handle, the frame being adapted to engage a removable ring on which the net body is carried. By reason of this arrangement, the ring can be detached from the handle and associated support frame, to permit free interchanging of rings having net bodies permanently associated therewith, which net bodies may be of different meshes. In this way, a relatively inexpensive ring can be provided, with the net body pre-strung thereon, which ring can be inserted into the associated support frame whenever a net of the particular mesh is desired, for a specified purpose.

A more specific object of the invention is to provide a fish net as described which will be possessed of a particularly high strength so far as is the means for supporting the net body is concerned.

Yet another object is to provide a fish net as stated in which the attachment or detachment of the ring from the associated support frame can be carried out with marked speed and ease.

Still another object of importance is to provide a fish net as stated wherein the ring, in at least one form of the invention, can be adjustably tightened to the support frame, thus to tension a ring in a position in which the ring will be securely engaged with the support frame against accidental removal.

Yet another object of importance is to provide a fish net as described in which rings of different diameters and outer configurations can be employed, so that one can assemble with a single handle and support frame, any one of a plurality of net body supporting rings believed most suitable for the particular operation to be performed, thus allowing one to use a small net, large net, or, in either a small or large net, a mesh net body of small or large mesh.

Other objects will appear from the following description, the claims appended thereto, and from the annexed drawing in which like reference characters designate like parts throughout the several views and wherein:

Figure 1 is a perspective view of a fish net formed in accordance with the present invention, with portions thereof being broken away.

Figure 2 is an enlarged, fragmentary, sectional view taken substantially on line 2—2 of Figure 1 and showing one form of the invention.

Figure 3 is a cross sectional view, shown on a somewhat enlarged scale, taken along line 3—3 of Figure 1 and showing the form of the ring of the invention of Figure 2.

Figure 4 is a fragmentary longitudinal cross sectional view taken in a vertical plane, through the frame of the fish net showing the form of the invention in Figure 2.

Figure 5 is a cross sectional view, similar to Figure 3, showing another form of the ring of the invention.

Figure 6 is a fragmentary, top plan view of the fish net formed in accordance with the form of the invention shown in Figure 5.

With continued reference to the drawing, there is shown in Figure 1, a fish net, generally indicated at 10, constructed in accordance with this invention. The fish net 10 includes a tubular handle 12 preferably made of some light weight metal such as aluminum, and may be formed in such manner as to permit the handle to be shortened or lengthened by various known means, not shown. Thus, for example, when a net is to be used for boating relatively large fish, a short handle would be desired, while on the other hand, when the net is to be used for obtaining bait, as when seining for minnows, the long handle may be more appropriate.

In any event, the handle 12 has formed at its inner end 13 a pair of spaced sockets 14 extending longitudinally thereof and opening to the free end of the handle. The support frame, generally indicated at 16 is formed of a continuous piece of material such as molded plastic, steel or of light weight metal such as aluminum, and formed so as to have its opposite ends disposed adjacent each other to define a continuous periphery. The opposite ends 18 and 20 of the support frame are formed as laterally extending legs in slightly converging relation to each other and extending laterally from the substantially continuous periphery of the frame to be received in respective ones of the sockets 14. Screws 22 may be employed to secure the legs 18 and 20 in the sockets 14 as shown in Figures 2 and 6, with a throat 24 defined by the space between the spaced legs 18 and 20.

In the form of the invention shown in Figures 2, 3 and 4, the support frame is of hollow tubular material, preferably aluminum, with this length of tubular material being indicated at 26. A slot or groove 28 is provided in the tubular support frame 26 and opens through the inner surface thereof continuously about the periphery of the frame. A ring 30, of circular cross section, and of a resiliently deformable material is threaded or woven through the upper strands of the mesh net body 32, forming the net portion of the fish net 10. The mesh of the net may be coarse or fine depending upon the use to which the fish net is to be put.

With the net body 32 thus engaged upon the ring 30 so as to normally be dependingly carried thereby, one end 34, provided with a metal cap 36 at its free end and a resilient hook 38 pivotally carried in the cap may be inserted into the opening 40 provided in the tubular frame 26 adjacent the leg 18 and opening into the throat 14. The hook 38 may then be pivoted to the broken line position shown in Figure 2 to serve as a handle or gripping means so that the ring may be pulled through the hollow interior of the frame 26 with the net body extending outwardly through the slot or groove 28 and depending from the frame 26, as shown in Figure 3. The ring 30 is then pulled through the tubular frame 26 by the hook 38 serving as a handle until the other end 42 of the ring is disposed adjacent the opening 40 in the throat 24 while the end 34 emerges through an opening 44, similar to the opening 40, and is disposed in the throat 24 adjacent the end 42. A metal cap 46 is fixed on the free end of the rim remote from the end upon which the cap 36 is fixed, and the cap 46 is provided with a suitable opening therethrough to receive the hooked portion of the hook 38 as it is pivotally moved about its axis into interengaging, releasable connection with the end 42 of the ring. Thus, the rim will be secured, releasably at its opposite ends.

To replace the mesh net body 32 with a mesh net of finer screening or coarser screening, or to replace a torn net, it will be merely necessary to disengage the coupling means, defined by the hook 38 and the cap 46, and pull the ring 30 out of the tubular frame 26. The desired replacement fish net body can then be threaded onto the ring in the manner hereinbefore indicated, and the ring again slid into the interior of the tubular frame 26 so that the mesh net body hangs downwardly therefrom in use.

With respect to the form of the invention shown in Figures 5 and 6, it will be noted that the ring 48, similar to the ring 30, is threaded or woven through the uppermost strands of a mesh net body 32. The ring 48 thus provided with a depending mesh net body will be received in the groove or slot 50 formed in the solid tubular frame 52, with the slot opening to the interior or inside of the periphery of the frame as it is formed as a substantially continuous ring, in the manner of the hollow tubular support frame 26 so that the legs 54 and 56 formed in spaced relation at the opposite ends thereof will be received in the sockets 14 at the adjacent end of the handle 12, in the manner described in connection with the legs 18 and 20, and secured therein by screws or other fastening means, such as the screws 22. The ring 48 may be of considerably stiffer material than the ring 30 and has its opposite ends 58 and 60 provided with external threading to receive thereon a turnbuckle 62 after the ring has been placed in the groove 50 so that the turnbuckle may be operative to secure and tighten the ring, which is conformably shaped to the periphery of the support frame 52, to assist in holding the ring within the groove 50 while the fishing net is being used. Thus, there is provided a coupling means, the turnbuckle 62, whereby the ring can be detachably secured at its opposite ends in the support frame.

As it will be clearly seen, it will be a simple matter to replace a mesh net body on the ring 48 by merely uncoupling the opposite ends of the ring by turning the turnbuckle in the proper direction, and rethreading or weaving the ring through the upper loops of the mesh net body.

In both forms of the invention, it will be apparent that the upper loops of the mesh net body are totally enclosed in the main frame and cannot be worn by use of the net as it scrapes along objects during its use.

For ease of transport, it will be apparent that the screws 22 may be removed and the main support frame and the handle may be carried separately and then reassembled at the place of use.

Also, in connection with the form of the invention shown in Figures 5 and 6, it will be noted that the groove or slot 50 opens at its opposite ends into the throat 64 defined between the spaced legs 54 and 56, with the turnbuckle 62 disposed at the entrance of the throat 64, in a position similar to the coupling means of the form of the invention shown in Figures 2 to 4.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A fish net comprising a handle, a support frame having its opposite ends extending laterally therefrom in spaced relation to define a throat therebetween, said ends being detachably secured to said handle, said support frame having a peripherally extending slot therein opening through the inner periphery thereof and opening at its opposite ends into said throat, a flexible ring having a net body dependingly carried thereby removably received in said slot, the opposite ends of said ring being disposed in said throat, and coupling means carried by the opposite ends of the ring for detachably securing them together in said throat, said coupling means extending circumferentially of the ring free of and in spaced relation to the handle and restraining the ends of the ring against movement circumferentially of the ring away from each other.

2. A fish net comprising a handle, a support frame having its opposite ends extending laterally therefrom in spaced relation to define a throat therebetween, said ends being detachably secured to said handle, said support frame having a peripherally extending slot therein opening through the inner periphery thereof and opening at its opposite ends into said throat, a flexible ring having a net body dependingly carried thereby removably received in said slot, the opposite ends of said ring being disposed in said throat, and coupling means carried by the opposite ends of the ring for detachably securing them together in said throat, said coupling means extending circumferentially of the ring free of and in spaced relation to the handle and restraining the ends of the ring against movement circumferentially of the ring away from each other, said support frame being of hollow tubular form and said slot opening into the interior thereof and to its inner periphery, the ends of the ring terminating at locations occurring on the circumference of the ring, said ring being loosely received within the hollow interior of said frame with the mesh net body extending through said slot, and said ring being freely rotatable relative to the frame following uncoupling of said ends thereof, for disengagement of the ring from said body.

3. A fish net comprising a handle, a support frame having its opposite ends extending laterally therefrom in spaced relation to define a throat therebetween, said ends being detachably secured to said handle, said support frame having a peripherally extending slot therein opening through the inner periphery thereof and opening at its opposite ends into said throat, a flexible ring having a net body dependingly carried thereby removably received in said slot, the opposite ends of said ring being disposed in said throat, and coupling means carried by the opposite ends of the ring for detachably securing them together in said throat, said coupling means extending circumferentially of the ring free of and in spaced relation to the handle and restraining the ends of the ring against movement circumferentially of the ring away from each other, said support frame being of hollow tubular form and said slot opening into the interior thereof and to its inner periphery, the ends of the ring terminating at locations occurring on the circumference of the ring, said ring being loosely received within the hollow interior of said frame with the mesh net body extending through said slot, said ring being freely rotatable relative to the frame following uncoupling of said ends thereof, for disengagement of the ring from said body, said coupling means including a hook pivotally carried at one end of said ring and a cap having an opening therethrough carried on the other end of the ring with the hook being releasably engaged in the opening in said cap.

4. A fish net comprising a handle, a support frame having its opposite ends extending laterally therefrom in spaced relation to define a throat therebetween, said ends being detachably secured to said handle, said support frame having a peripherally extending slot therein opening through the inner periphery thereof and opening at its opposite ends into said throat, a flexible ring having a net body dependingly carried thereby removably received in said slot, the opposite ends of said ring being disposed in said throat, and coupling means carried by the opposite ends of the ring for detachably securing them together in said throat, said coupling means extending circumferentially of the ring free of and in spaced relation to the handle and restraining the ends of the ring against movement circumferentially of the ring away from each other, said support frame being of solid tubular form and said slot formed therein opening to the inner periphery of the frame, said ring conformably shaped to the peripheral shape of said frame and loosely received in said slot with said net body extending through the slot to depend from the frame, the ends of the ring terminating at locations occurring on the circumference of the ring, said coupling means comprising a turnbuckle operatively engaged between said ends of said ring to releasably secure the ends together and to place the ring under pressure to seat in said slot, and said ring being freely rotatable relative to the frame following uncoupling of said ends thereof, for disengagement of the ring from said body.

5. A fish net comprising a handle, a support frame having its opposite ends extending laterally therefrom in spaced relation to define a throat therebetween, said ends being detachably secured to said handle, said support frame having a peripherally extending slot therein opening through the inner periphery thereof and opening at its opposite ends into said throat, said slot opening upon the surface of the frame over an angular distance substantially less than one hundred and eighty degrees of the circumference of said surface, a flexible ring having a net body dependingly carried thereby removably received in said slot, the opposite ends of said ring being disposed in said throat, and coupling means carried by the opposite ends of the ring for detachably securing them together in said throat, said coupling means extending circumferentially of the ring free of and in spaced relation to the handle and restraining the ends of the ring against movement circumferentially of the ring away from each other.

References Cited in the file of this patent
UNITED STATES PATENTS

| | | |
|---|---|---|
| 1,543,568 | Howard | June 23, 1925 |
| 2,482,718 | Oathout | Sept. 20, 1949 |